United States Patent [19]
Richardson, Jr.

[11] Patent Number: 5,362,920
[45] Date of Patent: Nov. 8, 1994

[54] TRANSMISSION LINE SPACER-DAMPER DEVICE

[76] Inventor: Albert S. Richardson, Jr., 3 Wingate Rd., Lexington, Mass. 02173

[21] Appl. No.: 61,183

[22] Filed: May 13, 1993

[51] Int. Cl.$^5$ .......................... H02G 7/12; H02G 7/14
[52] U.S. Cl. ...................................... 174/42; 174/146
[58] Field of Search .................................. 174/42, 146

[56] References Cited

U.S. PATENT DOCUMENTS

| | | | |
|---|---|---|---|
| 3,032,605 | 5/1962 | Gerlach et al. | 174/40 R X |
| 3,659,034 | 4/1972 | Rawlins et al. | 174/42 |
| 3,971,881 | 7/1976 | Hawkins | 174/40 R |
| 4,777,327 | 10/1988 | Richardson, Jr. | 174/42 |

FOREIGN PATENT DOCUMENTS 43-21950  9/1968  Japan .................................. 174/146

OTHER PUBLICATIONS

Hirai et al., "Four-Bundled Conductor Spacer", Nov. 1970, pp. 68–75.
McGraw–Hill, "Transmission and Distribution—Anti-Galloping Devices: Now an Accepted Solution", Reprinted from Electrical World, (Jan. 1993).

*Primary Examiner*—Leo P. Picard
*Assistant Examiner*—Hyung S. Sough
*Attorney, Agent, or Firm*—Hamilton, Brook, Smith & Reynolds

[57] ABSTRACT

A spacer damper for installation on twin, triple, or quad bundled lines at various distances along the line to provide proper separation and effective vibration damping of the subconductors includes a structural hoop about which two or more clamps are positioned at equal intervals. The distance between the clamps is maintained by springs about the hoop and between the clamps that compress against each side of the clamp through a flat washer and a rubber washer. The clamps allow attachment of the spacer damper to the subconductors.

3 Claims, 5 Drawing Sheets

TRANSMISSION LINE SPACER-DAMPER DEVICE

BACKGROUND OF THE INVENTION

Transmission lines that are used to transmit electrical energy are often characterized as, high voltage lines, extra high voltage (EHV) lines, and ultra high voltage (UHV) lines. The voltage levels in each category are approximately, under 300 kilovolts (kV), 300kV to 500kV, and over 500kV, respectively. Transmission lines that are in the category of EHV and UHV are referred to as bulk power transmission lines, meaning that power is transferred along the lines from a generating point to a distribution point over great distances which can be as much as several hundred miles. Another feature of such power delivery is that total power is in the range of hundreds of megawatts delivered to the distribution point or load point. It is not uncommon to see several transmission lines, consisting of three phase conductors each, passing over a common right-of-way from the generation point to the load point. These lines may be located in open farmlands, or hilly terrain, or up and down a mountainside. In any case the uninterrupted delivery of power to the load point is a primary concern. Economy of delivers is also a major concern in the design of the line.

One way of achieving economical design at the EHV and UHV voltages is to cause the conductors to be bundled. A bundled conductor differs from a single conductor because two or more conductors are tied together by devices known as spacers, or spacer-dampers. These devices are designed to keep the individual wires in a bundle separated by a fixed distance, usually 18 inches. The spacing of the spacer devices from each other along the line is about 200 feet. Hence, a line having a span of 1000 feet will have four spacers, or spacer-dampers along its span length. Since there are three phases in a circuit, a single span of 1000 feet will have twelve spacers or spacer-dampers. Therefore, there are approximately fifty spacer units per mile, or five thousand spacer units per 100 miles of line.

Modern spacers are called spacer-dampers because they combine the function of spacing the bundle with the damping of the vibration of the individual wires in the bundle. The individual wires are called subconductors. A typical 500kV line will have three subconductors per phase in the shape an inverted equilateral triangle (inverted delta) with 18 inches separating each subconductor. Other lines may have only two subconductors and these are also separated by spacer-dampers at 18 inches, usually in a horizontal plane. Other higher voltage lines may have four subconductors in a square box arrangement separated at 18 inch intervals. A typical voltage in the case of two subconductors is 345kV, while a typical voltage in the case of four subconductors is 765kV.

There are as many different ways to design spacer-damper devices as there are manufacturers that make them. Competitive cost is always a major concern. Long life in service over a period of twenty years or more is a major concern as well. Most especially, it is desired to provide a spacer-damper that performs effectively to dampen vibration of the subconductors without damaging the individual wires. Another factor which is very important is to provide a device that is easy and quick to install on the line. This usually means that a quick-acting, positive-locking bolt or clip is needed. This is especially needed when the spacer-damper units are to be contracted on the basis of lowest cost.

SUMMARY OF THE INVENTION

The present invention spacer damper device provides the necessary spacing of subconductors from each other while allowing the subconductors to vibrate without causing damage to the subconductors. The spacer damper device includes a series of clamps spaced along a hoop formed of rigid material by a series of springs about the hoop which are between the clamps.

In preferred embodiments, a pair of aluminum clamps are used to fix the relationship between the subconductors along the rigid hoop, and to provide attachment to the subconductors while allowing articulation in the case of bending vibration. The most dangerous case of fatigue is the bending of the subconductor against the clamp. Other spacer-dampers do not allow freedom of bending. The present invention allows freedom of bending so that zero bending stress occurs during any subconductor vibration. The articulation in the present invention is resisted by a rubber washer which is positioned along the rigid hoop and sandwiched between the clamp and the flat steel washer. Each steel washer is adjacent to a spring. This causes the rubber washer to resist bending motion by shearing in the rubber. In the event that the rubber fails over a long time, the pressure provided by the springs will continue to push the steel washer against the clamp, thus resisting bending of the subconductor by dry friction (coulomb type damping).

The above described damping action will occur in any number of subconductors from two to four to six or more. The only difference between spacer-damper parameters is the number of subconductors and the diameter of the hoop.

Individual design of the product may be achieved by varying the diameter of the hoop, the diameter of the round rod that forms the hoop, the size of the clamps that attach to the subconductor, the number of clamps, the spacing of the clamps, the composition of the material (common grade steel etc.), and the design of the clamp itself.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating of the invention.

DETAILED DESCRIPTION OF THE PREFERRED EMBODIMENT

Figure 1:
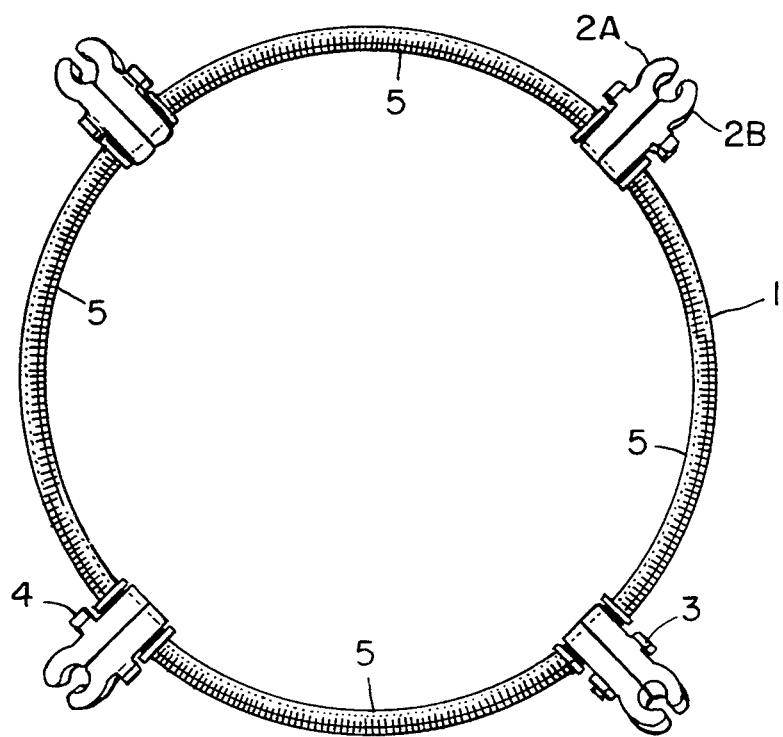
FIG. 1 is a view looking along the line of a four (quad) bundle line showing the present invention based on a two foot square bundle configuration.

Apparatus for spacing two or more subconductors in a span of several subconductors is shown in FIGS. 1, 2, 4 and 7. Included therewith are means to dampen vibration of the subconductors. A structural component is formed in the shape of a closed hoop 1. Before fixing the ends of the hoop 1 by welding, clamps 2A and 2B are threaded along the hoop together with springs 5, rubber washers 6 and flat washers 7. Spacing of the subconductors is controlled by the position of the clamps 2A and 2B around the hoop.

A single bolt 3 is used to fix the clamps 2A and 2B to the subconductor by tightening to a locknut 4 which in turn is held in place by a retainer 8 which prevents the nut from turning. Rubber washers 6 are pressed against the sides of the clamps 2A and 2B by precompressed springs 5 bearing against flat washers 7.

If vibration is occurring in one or more of the subconductors due to wind or other causes, the bending of the subconductor against the clamps 2A and 2B induces rotation of the clamps 2A and 2B about the hoop 1. Such rotation is resisted by shearing stress in the rubber washers 6 or by dry friction between the flat washers 7 and the springs 5. This resistance is one form of damping that occurs.

Another form of damping is caused by the movement of the subconductor perpendicular to the hoop 1. This action causes the clamps 2A and 2B to move a small amount in the radial direction against the hoop 1. The resulting kinetic impact creates energy loss which causes damping.

Another form of damping is caused by the movement of the subconductor tangentially along the hoop 1. This action causes the clamp 2A and 2B to compress the spring 5 or allow the spring 5 to extend itself from its initial compression. In either case energy is stored and released during a cycle of vibration. The energy that is stored and released is accompanied by energy lost which causes damping.

A further form of damping is provided by movement of the spring 5 against the hoop 1 in a radial direction. This action creates kinetic impact between the spring 5 and the hoop 1 during a cycle of vibration. Such impact causes damping to occur.

In the event that the rubber washer wears out after several years of use the loss of this one form of damping will not require the replacement of the entire unit because the other forms of damping identified above will continue to act.

Figure 2:
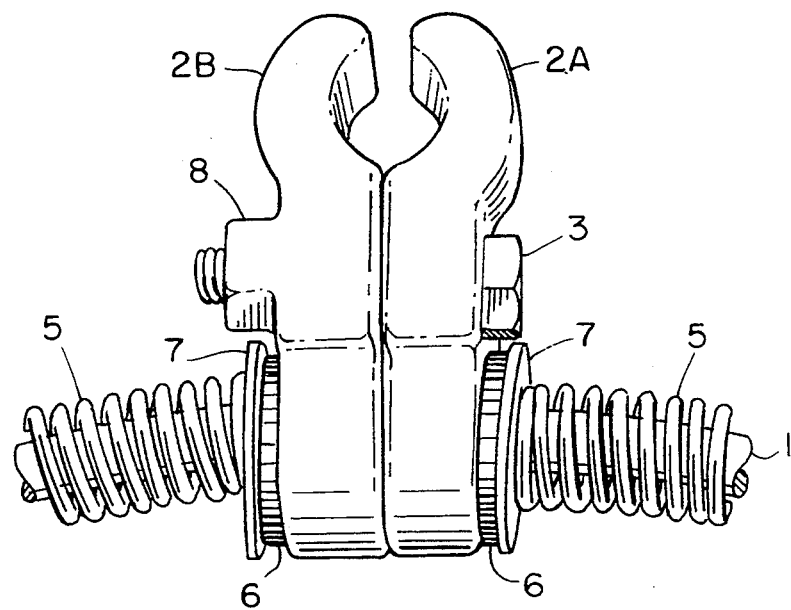
FIG. 2 is a close-up view of the aluminum clamps illustrating the single bolt keeper, the nut retainer (on the left side), the rubber washer grommets between the clamps and the flat steel washers, and the compressed springs over the steel hoop.
Figure 3:
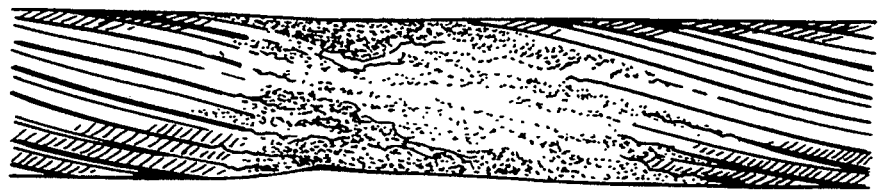
FIG. 3 illustrates the type of subconductor damage that occurs if the spacer-damper is improperly designed.
Figure 4:
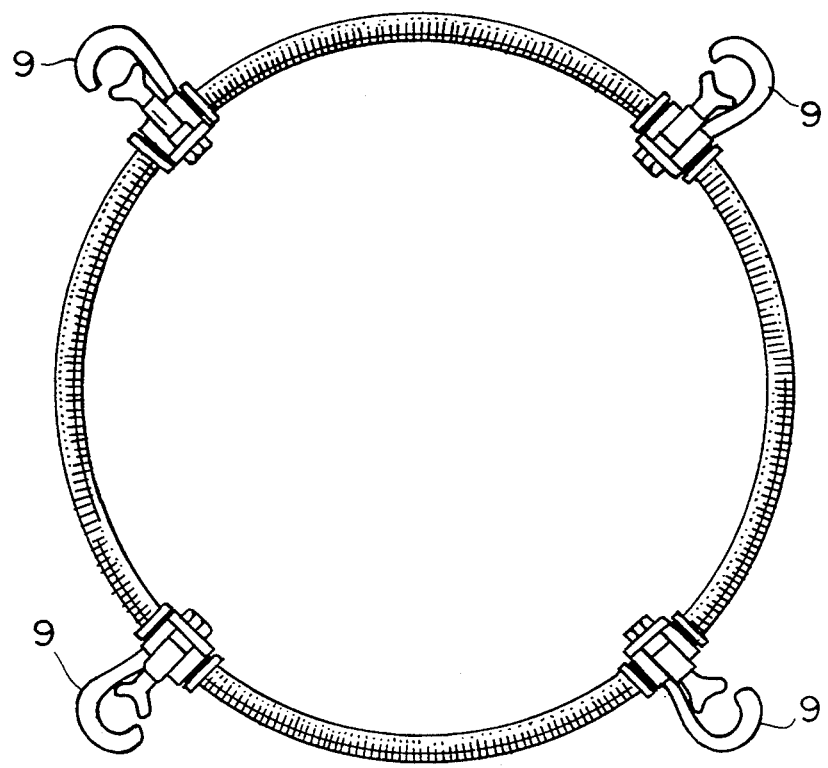
FIG. 4 illustrates the type of clamp that is used for UHV voltage higher than 620kV.
Figure 5A:
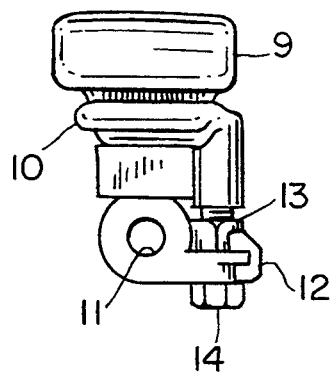
FIGS. 5A–5C illustrate the clamp components that are used for UHV voltage higher than 620kV.
Figure 5B:
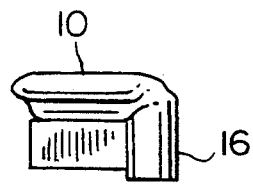
Figure 5C:
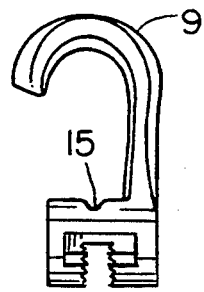

Another preferred embodiment of the invention depicted in FIGS. 4 and 5A-5C can be used for UHV voltage levels above 620kV. In this form the clamp 9 consists of a single piece of aluminum casting shaped in a way to gradually penetrate the electric field. The subconductor bears against the inside of the clamp 9 and is fixed in place by a keeper 10. The keeper 10 is shaped to allow its insertion after the subconductor is in place. A slot 15 is provided in the clamp 9 to allow the keeper 10 to slide under the subconductor until the keeper 10 is prevented from further sliding by the larger portion 16. This larger portion 16 is also recessed to receive a bolt 14 which bears against the keeper 10 forcing the subconductor to bear against the underside of the clamp 9. The bolt 14 is held in place by a captive locknut 13 which is further held by retainer 12. The clamp 9 is positioned along the hoop 1 in the same manner as the previous clamps 2A and 2B (FIGS. 1 and 2). The clamp 9 has a core 11 which allows free rotation of the clamp 9 about the hoop 1 during any type of subconductor vibration. All of the four forms of vibration damping previously identified will be active with the clamp 9.

Figure 6:
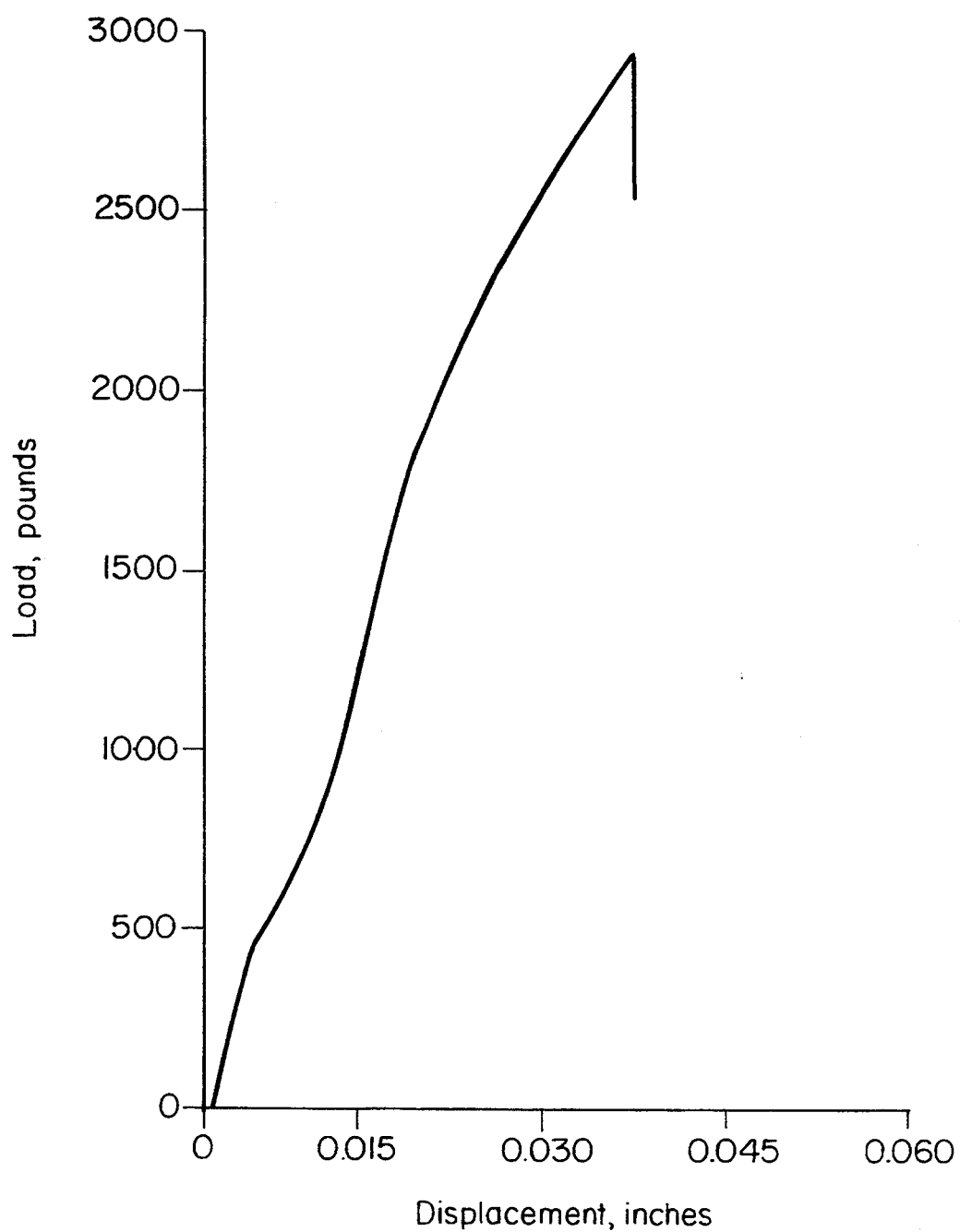
FIG. 6 illustrates the maximum load and deflection of the sleeve clamp.

In FIG. 6, the maximum load and deflection of the sleeve clamp is graphically show.

Figure 7:
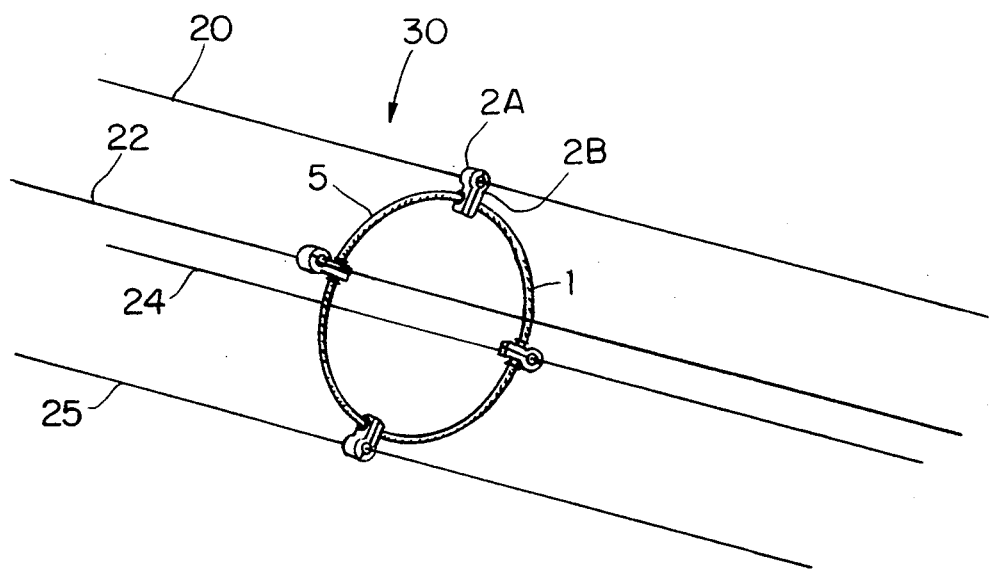
FIG. 7 illustrates the setup of the spacer damper device attached to subconductors.

FIG. 7 illustrates the setup of the test conducted at Georgia Power Co. to determine the maximum allowed voltage of 620kV before corona discharge. Subconductors 20, 22, 24 and 25 are spaced apart and dampened by spacer damper 30.

Figure 8:
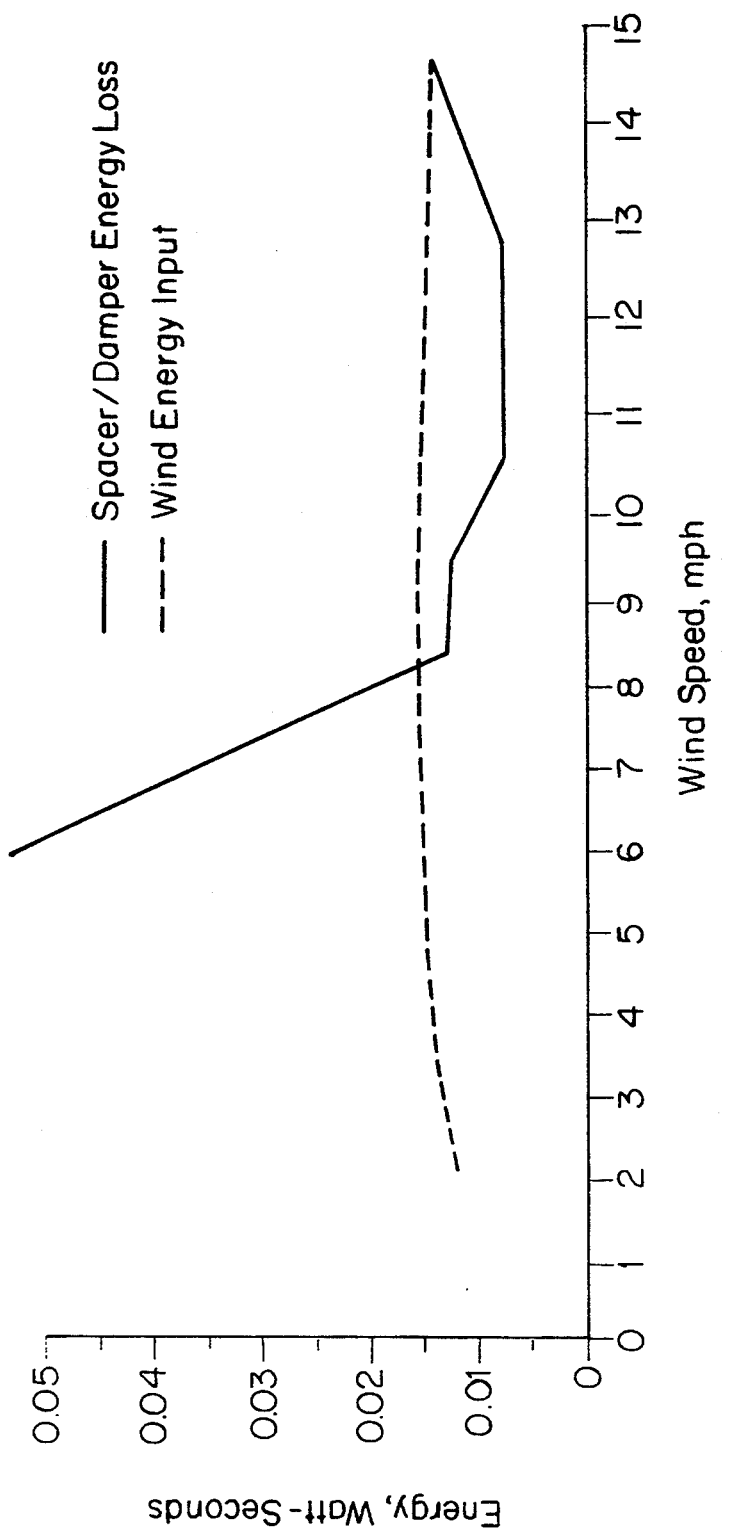
FIG. 8 illustrates the energy loss plotted against wind speed for a typical triple bundle conductor.

FIG. 8 illustrates the energy loss plotted against wind speed for a typical triple bundle conductor. These results were obtained by testing triple bundle spacer-damper in a laboratory at Georgia Power Research Laboratories. The energy input from the wind is shown for comparison on a span length of 1000 feet. This illustrates that four spacer-damper units will easily control the wind energy input.

EQUIVALENTS

While this invention has been particularly shown and described with references to preferred embodiment thereof, it will be understood by those skilled in the art that various changes and form and details may be made therein without departing from the spirit and scope of the invention as defined by the dependent claims.

What is claimed is:

1. A spacer-damper device for providing necessary spacing of multiple subconductors from each other while allowing the subconductors to vibrate without causing damage to the subconductors comprising:
   a hoop formed of rigid material;
   a series of clamps spaced along the hoop, the clamps being capable of sliding along the hoop and rotating about the hoop; and
   a series of springs about the hoop and between the clamps for separating the clamps along the hoop.

2. The spacer-damper device according to claim 1 in which the spacer damper provides attachment of the subconductors to one other while allowing articulation.

3. The spacer-damper device according to claim 1 further comprising:
   rubber washers about the hoop adjacent each clamp; and
   steel washers about the hoop and sandwiched between each rubber washer and each spring.

* * * * *